L. B. GRAHAM.
APPARATUS FOR OBTAINING DIRECT CURRENTS FROM ALTERNATING CURRENTS.
APPLICATION FILED OCT. 7, 1915.
1,221,311.   Patented Apr. 3, 1917.
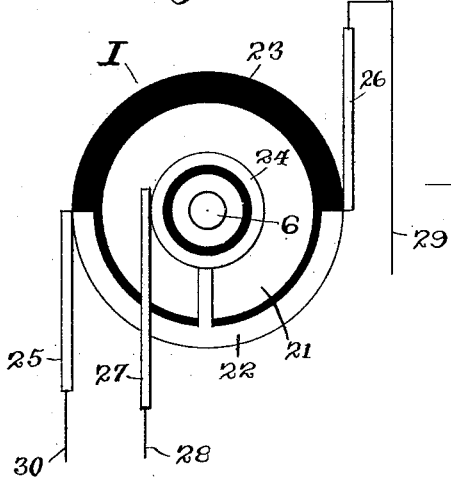
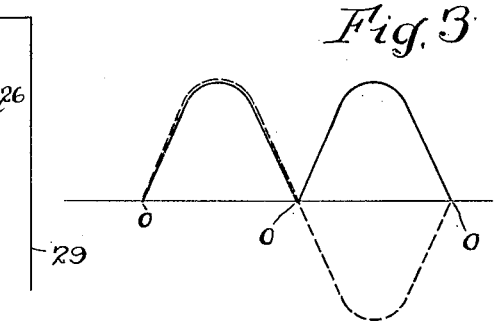
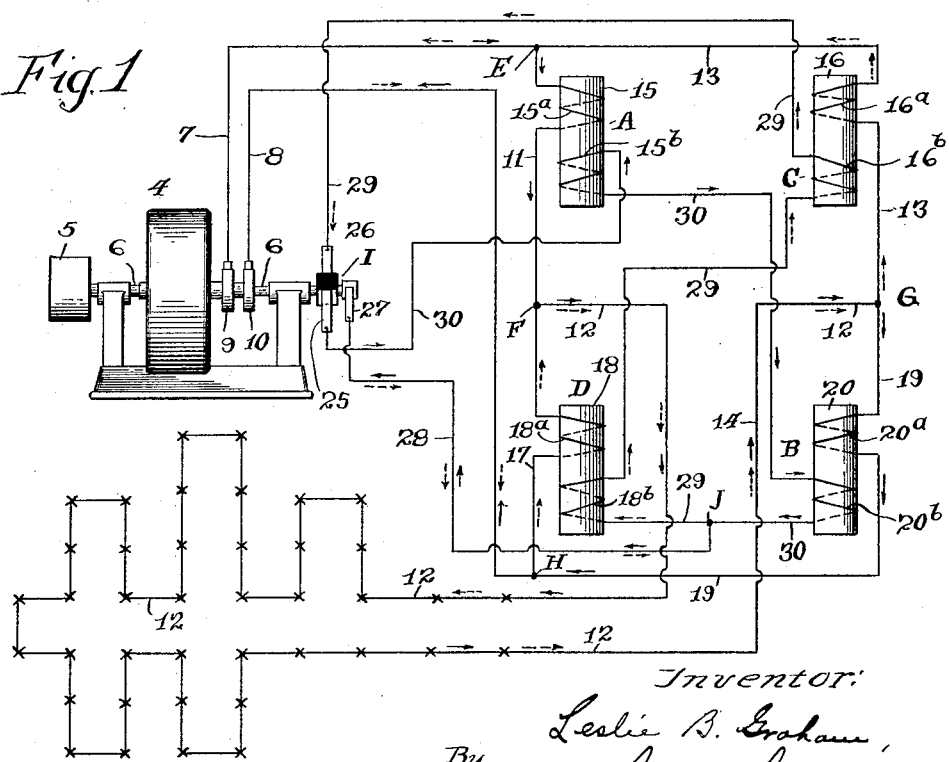
Inventor:
Leslie B. Graham,
By Adams & Jackson,
Attys.

UNITED STATES PATENT OFFICE.

LESLIE B. GRAHAM, OF EAST CHICAGO, INDIANA, ASSIGNOR OF ONE-THIRD TO HIMSELF, ONE-THIRD TO ALBERT H. ADAMS, OF OAK PARK, ILLINOIS, AND ONE-THIRD TO JOHN L. JACKSON, OF RIVER FOREST, ILLINOIS.

APPARATUS FOR OBTAINING DIRECT CURRENTS FROM ALTERNATING CURRENTS.

1,221,311. Specification of Letters Patent. Patented Apr. 3, 1917.

Application filed October 7, 1915. Serial No. 54,508.

*To all whom it may concern:*

Be it known that I, LESLIE B. GRAHAM, a citizen of the United States, and a resident of East Chicago, in the county of Lake and State of Indiana, have invented certain new and Improved Apparatus for Obtaining Direct Currents from Alternating Currents, of which the following is a specification, reference being had to the accompanying drawings.

My invention relates to apparatus for obtaining direct currents from alternating currents, and it has for its principal ultimate object the conversion of an alternating current into a direct current without any make-and-break in the alternating current circuit and without objectionable sparking when rectifying high potential currents, whereby direct currents of exceedingly high voltage and high amperage can be readily produced on a commercial basis.

A further object is to provide a rectifying apparatus well adapted for use at a central station, to produce a high potential direct current suitable for economic transmission. I accomplish these objects as illustrated in the drawings and as hereinafter described. That which I believe to be new is set forth in the claims.

In the accompanying drawings,—

Figure 1 is a view, principally diagrammatic, illustrating my invention;

Fig. 2 is an enlarged detail, illustrating one form of commutator suitable for use in the apparatus illustrated in Fig. 1; and Fig. 3 is a diagrammatic view illustrating the effect of the resistance elements in rectifying the alternating current.

Referring to the drawings,—

4 indicates an alternating-current generator of any suitable type, such, for example, as a two-pole generator, which is adapted to be driven from any suitable source of power applied to a pulley 5 mounted upon the generator shaft 6, as shown in Fig. 1. 7—8 indicate lead wires, which take the alternating current from the generator 4 through slip-rings 9—10, respectively. A—B—C—D indicate four resistance elements, each of which comprises a core and coils, as will be hereinafter described. As shown in Fig. 1, the lead wire 7 branches at the point marked E, to form two paths, one branch wire, indicated by 11, extending from the wire 7 to a point F where it connects with one terminal of a load wire 12, the other branch wire, which is marked 13, extending from the line wire 7 at the point E to a point G where it connects with the other terminal wire 14 of the load wire. The branch wire 11 is coiled around a core 15 which forms part of the resistance element A; and in like manner the branch wire 13 is coiled around a core 16 which forms a part of the resistance element C. Similarly, the line wire 8 branches at the point H, to form two paths, one of said branch wires, indicated by 17, extending from the line wire 8 at the point H to the point F where it connects with the load wire 12. Between the points H and F the wire 17 is coiled upon a core 18 which forms a part of the resistance element D. The other branch of the wire 8, indicated by 19, extends from point H to point G after being coiled upon a core 20 which forms a part of the resistance element B, and connects at the point G with the load wire 14. Thus, each of the line wires is connected by its branch wires with the terminals of the load wires, and each of such branch wires is coiled around the core of a resistance element between the point of its connection with the current wire and the load wire. I indicates a commutator mounted upon the shaft 6 of the generator and rotating therewith. One form of commutator which is well adapted for use in this connection is shown in Fig. 2. It comprises a ring or cylinder 21 having on its periphery a conducting segment 22 extending through an arc of one hundred and eighty degrees and a non-conducting segment 23 of equal extent. A slip-ring 24 is mounted adjacent to the ring 21 and is in constant electrical connection with the segment 22. 25—26 indicate two brushes which bear upon the periphery of the ring 21 at diametrically opposite points, and 27 indicates a brush which bears upon the periphery of the slip-ring 24. 28 indicates a wire which is connected with the brush 27 and extends to a point J where it connects with wires 29—30. The wire 29 extends from the point J to the brush 26 after being wound around the cores 18 and 16, and the wire 30 extends from the point J to the brush 25 after being wound upon the cores 20 and 15, in the manner illustrated in Fig. 1. Thus, two secondary circuits are formed, one including cores 16 and 18 and the other the cores 15 and 20. The several coils, for convenience of reference, are marked $15^a$, $15^b$, $16^a$, $16^b$, $18^a$, $18^b$, and $20^a$, $20^b$.

It will be understood that the commutator I is so mounted upon the armature shaft 6 that connection is made between the brush 25 and the conducting segment 22, or between the brush 26 and said segment, at practically the instant of wave alternation, as indicated at points O in Fig. 3, at which time the current impulse is inappreciable and consequently there is no danger of sparking,—contact being made between the brush 25 and the segment 22 at the beginning of one wave impulse, as the positive, for example, and contact being made between the brush 26 and said segment 22 at the beginning of the other or negative impulse. Thus, the wire 30 will carry all the positive impulses of the secondary current and the wire 29 all the negative impulses of said current, as will be hereinafter more clearly manifest.

When the generator 4 is in operation, current flows through wire 7 branches at the point E, and if there were nothing to prevent would flow over both wires 11 and 13. The flow of current through the coils $15^a$ and $16^a$ tends to induce a secondary current in coils $15^b$ and $16^b$, but the commutator I is so mounted as to establish a closed circuit through the coils $15^b$ and $20^b$, and to open the circuit which includes coils $16^b$ and $18^b$, at the beginning of each positive alternation, and to reverse said secondary circuits at the beginning of each negative alternation. When, therefore, current flows over wire 7, the resistance element C opposes the flow of current through coil $16^a$, whereas coil $15^b$ being in the closed circuit no opposition is presented to the flow of current through coil $15^a$. Consequently the current flows through wire 11 to the point F where it connects with the load line 12. The load current returns over wire 14 to point G, and thence passes by wire 19 around coil $20^a$, the resistance element B offering no opposition, for the same reason as given in connection with resistance element A. The current then returns to slip-ring 10 by wires 19 and 8, flowing in the direction indicated by the arrows in full lines. Upon the opposite alternation current flows by wire 8, as indicated by the dotted arrows, to point H, and thence passes around coil $18^a$, its flow being unopposed owing to the action of the commutator I, as above set forth. Resistance element B at this time opposes the flow of current through wire 19 and coil $20^a$ owing to the fact that the auxiliary circuit which includes coil $20^b$ is open. Current then flows from point F over load line 12 in the same direction as before, returning over wire 14, and then passes by wire 13 around coil $16^a$ back to the generator by wires 13 and 7.

By mounting the commutator I upon the generator shaft, as described, the appropriate energization of the resistance elements to permit the flow of, or to offer opposition to the flow of wave impulses of the alternating current of one sign or the other is positively maintained in exact synchronism with such wave impulses, and consequently the resistance wave induced in each of the resistance elements corresponds exactly with the alternating wave of corresponding sign of the generator current.

So far as I am aware, no one has heretofore proposed to provide an apparatus of the character described in which the energization of the resistance elements is controlled by a commutator mounted on the generator shaft so as to insure proper synchronism; nor has it been proposed to connect a single load circuit with an alternating current generator in association with resistance elements operating to deliver direct current to such load circuit without reducing the number of waves or impulses as delivered by the generator.

It will be understood that my improved apparatus may be employed in connection with polyphase currents, a number of commutators and sets of resistance elements corresponding with the number of phases of the current being used, the same load circuit being, however, connected to receive current from all of such sets in the manner described.

That which I claim as my invention, and desire to secure by Letters Patent, is,—

1. An apparatus of the character described, comprising an alternating-current generator, an electrically-controlled resistance element interposed in the path of said generator current and acting to oppose the passage of current impulses of one sign therethrough, a secondary circuit for appropriately energizing said resistance element, and a commutator mounted on the generator shaft and acting to positively maintain synchronism between the impulses of the alternating current and the energization of said resistance element.

2. An apparatus of the character described, comprising an alternating-current generator, means for dividing current therefrom into two paths, electrically-controlled resistance elements interposed respectively in said paths and acting to oppose the passage of current impulses of opposite signs through said paths, respectively, secondary circuits for appropriately energizing said resistance elements, and means for maintaining synchronism between the impulses of the alternating current from said generator and the energization of said resistance elements.

3. An apparatus of the character described, comprising an alternating-current generator, means for dividing current therefrom into two paths, electrically-controlled resistance elements interposed respectively in said paths and acting to oppose the passage of current impulses of opposite signs through said paths, respectively, secondary circuits for appropriately energizing said resistance elements, and a commutator connected with the generator shaft for maintaining synchronism between the impulses of the alternating current from said generator and the energization of said resistance elements.

4. An apparatus of the character described, comprising an alternating-current generator, means for dividing current therefrom into two paths, electrically-controlled resistance elements interposed respectively in said paths and acting to oppose the passage of current impulses of opposite signs through said paths, respectively, secondary circuits for appropriately energizing said resistance elements, means for maintaining synchronism between the impulses of the alternating current from said generator and the energization of said resistance elements, and a single load circuit connected with said paths.

5. An apparatus of the character described, comprising an alternating-current generator, means for dividing current therefrom into two paths, electrically-controlled resistance elements interposed respectively in said paths and acting to oppose the passage of current impulses of opposite signs through said paths, respectively, secondary circuits for appropriately energizing said resistance elements, a commutator connected with the generator shaft for maintaining synchronism between the impulses of the alternating current from said generator and the energization of said resistance elements, and a single load circuit connected with said paths.

LESLIE B. GRAHAM.

Copies of this patent may be obtained for five cents each, by addressing the "Commissioner of Patents, Washington, D. C."